(12) United States Patent
Hayes et al.

(10) Patent No.: US 9,187,673 B2
(45) Date of Patent: *Nov. 17, 2015

(54) POLYESTER COATING COMPOSITION

(75) Inventors: Gregory B. Hayes, Bowling Green, KY (US); Thomas Melnyk, Greenfield, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,288

(22) Filed: Oct. 6, 2011

(65) Prior Publication Data
US 2012/0058354 A1 Mar. 8, 2012

Related U.S. Application Data

(63) Continuation of application No. PCT/US2010/030576, filed on Apr. 9, 2010.

(60) Provisional application No. 61/168,051, filed on Apr. 9, 2009.

(51) Int. Cl.
C08G 63/60 (2006.01)
C08F 283/00 (2006.01)
C08G 63/00 (2006.01)
C08G 63/02 (2006.01)
C09D 167/06 (2006.01)
C09D 175/06 (2006.01)

(52) U.S. Cl.
CPC ............ C09D 167/06 (2013.01); C09D 175/06 (2013.01); *Y10T 428/31681* (2015.04)

(58) Field of Classification Search
None
See application file for complete search history.

(56) References Cited

U.S. PATENT DOCUMENTS

| | | | |
|---|---|---|---|
| 3,166,434 A | 1/1965 | Gauger, Jr. | |
| 3,306,868 A | 2/1967 | Adrian, Jr. | |
| 3,333,022 A | 7/1967 | Reiners et al. | |
| 3,340,327 A | 9/1967 | Spellberg et al. | |
| 3,343,806 A | 9/1967 | Bobo et al. | |
| 3,448,066 A | 6/1969 | Parker | |
| 3,477,996 A | 11/1969 | Formaini | |
| 3,674,727 A | 7/1972 | Fekete et al. | |
| 3,867,480 A | 2/1975 | Fujiyoshi et al. | |
| 3,919,063 A | 11/1975 | Maruyama et al. | |
| 3,933,757 A | 1/1976 | Pratt et al. | |
| 3,965,059 A | 6/1976 | Kerridge et al. | |
| 3,986,992 A | 10/1976 | Canning et al. | |
| 3,988,288 A | 10/1976 | Yamauchi et al. | |
| 4,010,130 A | 3/1977 | Matsuo et al. | |
| 4,073,827 A | 2/1978 | Okasaka et al. | |
| 4,167,542 A | 9/1979 | Nelson | |
| 4,206,291 A | 6/1980 | Takahashi et al. | |
| 4,340,519 A | 7/1982 | Kotera et al. | |
| 4,360,647 A | 11/1982 | Hefner, Jr. | |
| 4,443,580 A | 4/1984 | Hefner, Jr. | |
| 4,452,954 A | 6/1984 | Schade et al. | |
| 4,522,977 A * | 6/1985 | Gardner | ........................... 525/48 |
| 4,631,320 A | 12/1986 | Parekh et al. | |
| 4,777,196 A | 10/1988 | Hefner, Jr. | |
| 5,198,471 A | 3/1993 | Nauman et al. | |
| 5,242,994 A | 9/1993 | Nield et al. | |
| 5,252,682 A | 10/1993 | Bayha | |
| 5,278,282 A | 1/1994 | Nauman et al. | |
| 5,288,805 A | 2/1994 | Kodali | |
| 5,290,828 A | 3/1994 | Craun et al. | |
| 5,314,751 A | 5/1994 | Nield et al. | |
| 5,693,715 A | 12/1997 | Kodali | |
| 5,739,215 A | 4/1998 | Westerhof et al. | |
| 5,916,979 A | 6/1999 | Koegler et al. | |
| 6,048,949 A | 4/2000 | Muthiah et al. | |
| 6,057,013 A | 5/2000 | Ching et al. | |
| 6,069,187 A | 5/2000 | Kusumoto et al. | |
| 6,258,897 B1 * | 7/2001 | Epple et al. | ................... 525/437 |
| 6,306,934 B1 | 10/2001 | Bode et al. | |
| 6,413,648 B1 | 7/2002 | Heyenk et al. | |
| 6,472,480 B1 | 10/2002 | Anderson | |
| 6,512,025 B2 | 1/2003 | Choudhery | |
| 6,710,151 B2 | 3/2004 | Kuwatsuka et al. | |
| 6,818,151 B2 | 11/2004 | Yang et al. | |
| 6,893,678 B2 | 5/2005 | Hirose et al. | |
| 6,930,161 B2 | 8/2005 | Schwarte et al. | |
| 6,974,631 B2 | 12/2005 | Hayes et al. | |
| 7,198,849 B2 | 4/2007 | Stapperfenne et al. | |
| 7,244,506 B2 | 7/2007 | Hayes et al. | |
| 7,247,390 B1 | 7/2007 | Yang et al. | |

(Continued)

FOREIGN PATENT DOCUMENTS

| | | |
|---|---|---|
| AU | 654600 | 6/1993 |
| CN | 1803890 A | 7/2006 |

(Continued)

OTHER PUBLICATIONS

New Food Contact Approval, Smart Formulating Journal, Apr. 2010, Issue 7, p. 6, Evonik Degussa GmbH, Essen Germany (6 pages).
International Search Report and Written Opinion for corresponding International Application No. PCT/US2010/030576 mailed on Jul. 2, 2010 (9 pages).
Matasa, Claude G., The Orthodontic Materials Insider, Dec. 2004, vol. 16, No. 4, Orth-Cycle Co., Hollywood, FL, USA (8 pages).
Smith, P.L., et al., The Use of Dicyclopentadiene in Polyesters, The Society of the Plastics Industry, Inc., 22nd Annual Meeting of the Reinforced Plastics Division in Washington, D.C., USA, Jan. 31, Feb. 1-3, 1967 (13 pages).
EVONIK DEGUSSA DYNAPOL® I 912 Polyester Resin Product Information, obtained from www.matweb.com (1 page).

(Continued)

*Primary Examiner* — Susannah Chung
*Assistant Examiner* — Robert T Butcher

(57) ABSTRACT

The present invention provides a coating composition having excellent adhesion to metal substrates. The coating composition includes a binder comprising a polyester resin having an adhesion promoting group and an optional crosslinker. The present invention also provides articles having the coating composition applied to at least a portion of a surface thereof.

12 Claims, No Drawings

(56) References Cited

U.S. PATENT DOCUMENTS

| | | |
|---|---|---|
| 7,326,752 B2 | 2/2008 | McAlvin et al. |
| 7,517,559 B2 | 4/2009 | Thiebes et al. |
| 7,763,323 B2 | 7/2010 | Mayr et al. |
| 8,575,280 B2 | 11/2013 | Uchida et al. |
| 8,663,765 B2 | 3/2014 | Skillman et al. |
| 8,697,210 B2 | 4/2014 | Stenson et al. |
| 8,758,644 B2 | 6/2014 | Share et al. |
| 8,946,316 B2 | 2/2015 | Stenson et al. |
| 8,946,346 B2 | 2/2015 | Skillman et al. |
| 2003/0064185 A1 | 4/2003 | Mazza et al. |
| 2004/0044117 A1 | 3/2004 | Kiefer-Liptak et al. |
| 2004/0134824 A1 | 7/2004 | Chan et al. |
| 2004/0198941 A1 | 10/2004 | Schwarte et al. |
| 2005/0038162 A1 | 2/2005 | Kuhlmann et al. |
| 2005/0129847 A1 | 6/2005 | Thiebes et al. |
| 2005/0196629 A1 | 9/2005 | Bariatinsky et al. |
| 2006/0093768 A1 | 5/2006 | Parekh et al. |
| 2006/0100366 A1 | 5/2006 | O'Brien et al. |
| 2006/0149019 A1 | 7/2006 | Wamprecht et al. |
| 2007/0281179 A1 | 12/2007 | Ambrose et al. |
| 2008/0015302 A1 | 1/2008 | Kiefer-Liptak et al. |
| 2008/0262613 A1 | 10/2008 | Gogolewski |
| 2010/0051862 A1 | 3/2010 | Share et al. |
| 2010/0056726 A1 | 3/2010 | Payot et al. |
| 2010/0260954 A1 | 10/2010 | Stenson et al. |
| 2011/0290696 A1 | 12/2011 | Stenson et al. |
| 2012/0027974 A1 | 2/2012 | Skillman et al. |
| 2012/0125799 A1 | 5/2012 | Doreau et al. |
| 2015/0175305 A1 | 6/2015 | Stenson et al. |
| 2015/0175839 A1 | 6/2015 | Skillman et al. |

FOREIGN PATENT DOCUMENTS

| | | |
|---|---|---|
| DE | 2245110 | 9/1972 |
| EP | 0548727 A2 | 12/1992 |
| EP | 0583777 A1 | 2/1994 |
| EP | 0780455 A2 | 6/1997 |
| EP | 1474490 B1 | 2/2003 |
| EP | 1498461 A1 | 5/2004 |
| EP | 1627898 A1 | 2/2006 |
| GB | 1280404 | 10/1972 |
| WO | 9407932 | 4/1994 |
| WO | 9519379 A1 | 7/1995 |
| WO | 9726304 A1 | 7/1997 |
| WO | 2004013240 A1 | 2/2004 |
| WO | 2008036629 A2 | 3/2008 |
| WO | WO 2008/124682 * | 10/2008 |
| WO | 2009117330 A1 | 9/2009 |
| WO | 2010055019 A1 | 5/2010 |
| WO | 2010118356 A1 | 10/2010 |

OTHER PUBLICATIONS

New Food Contact Approval, Smart Formulating Journal, Apr. 2010, Issue 7, p. 6, Evonik Degussa GmbH, Essen Germany. (6 pages).

Inventory of Effective Food contact Substance (FCS) Notifications, FCN No. 918, Evonik Degussa GMBH, having and Effective Date of Oct. 28, 2009. (2 pages).

* cited by examiner

POLYESTER COATING COMPOSITION

CROSS-REFERENCE TO RELATED APPLICATIONS

This application is a continuation-in-part application of PCT/US2010/030576 filed on Apr. 9, 2010 and entitled "POLYESTER COATING COMPOSITION", which claims priority to U.S. Provisional Application Ser. No. 61/168,051 filed on Apr. 9, 2009 and entitled "POLYESTER COATING COMPOSITION", each of which is incorporated herein by reference in its entirety.

BACKGROUND

Polymer coating compositions are routinely applied to substrates, especially metal substrates. Such coatings are used for a variety of reasons, including, for example, to protect the substrate from degradation, to beautify the substrate (e.g., to provide color, brightness, etc.), and/or to reflect light.

Many such polymer coating compositions are applied on planar substrate (e.g., using coil coating processes) which is subsequently formed into a finished article. The designer of such coatings is faced with a multitude of challenges in developing suitable coatings. For example, coating technologies are desired that perform well when applied to a variety of different types of metals, which may have differing surface characteristics and differing levels of cleanliness. In general, it is desired that the coatings adhere well to a variety of different substrates; exhibit suitable flexibility, hardness, and abrasion resistance (e.g., to endure fabrication steps required to form a finished article); and exhibit suitable aesthetic qualities. Achieving a suitable balance of coating properties at a suitably low cost can be difficult because, oftentimes, improvements made to one coating property are associated with degradation of another coating property. For example, improved coating hardness is often achieved to the detriment of coating flexibility.

Accordingly, there is a continuing need to discover and develop alternative coating compositions (preferably low cost coating compositions) that exhibit one or more enhanced coating properties.

SUMMARY

In one embodiment, the present invention provides a coating composition having excellent adhesion. The coating composition includes a binder that preferably comprises a polyester resin having one or more adhesion-promoting groups and more preferably one or more cycloaliphatic adhesion-promoting groups. In some embodiments, the adhesion-promoting groups are strained and/or unsaturated cycloaliphatic groups. Polycyclic groups are preferred adhesion-promoting groups, with bicyclic groups being preferred, and unsaturated bicyclic groups being particularly preferred. The coating composition may include one or more of the following optional ingredients: (i) a crosslinker, (ii) a pigment, (iii) an additional resin (e.g., a polyester resin lacking an adhesion-promoting group), and/or (iv) a liquid carrier. Hydroxyl-reactive crosslinkers are preferred for certain embodiments.

In another embodiment, the present invention provides coated substrates, typically metal substrates, having at least a portion of a surface coated with the coating composition described herein.

In yet another embodiment, the present invention provides a method of producing an article having at least a portion of a surface coated with the coating composition described herein.

By way of example, a planar metal substrate is provided that has a coating composition of the invention applied on at least a portion of the planar metal substrate. The coated metal substrate is then fabricated (e.g., stamped) to form a three-dimensional article.

DEFINITIONS

Unless otherwise specified, the following terms as used herein have the meanings provided below.

The term "cyclic group" means a closed ring hydrocarbon group that is classified as a cycloaliphatic group or an aromatic group, each of which can include heteroatoms. The term cycloaliphatic group means an organic group that includes at least one cyclic group that is not an aromatic group.

Substitution is anticipated on the organic groups of the polyesters used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon. As used herein, the term "group" is intended to be a recitation of both the particular moiety, as well as a recitation of the broader class of substituted and unsubstituted structures that includes the moiety.

The term "polycyclic" when used in the context of a group refers to an organic group that includes at least two cyclic groups in which one or more atoms (and more typically two or more atoms) are present in the rings of both of the at least two cyclic groups. Thus, for example, a group that consists of two cyclohexane groups connected by a single methlylene group is not a polycyclic group.

The term "crosslinker" refers to a molecule capable of forming a covalent linkage between polymers or between two different regions of the same polymer.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., polyester-urethane polymers).

The term "unsaturation" when used in the context of a compound refers to a compound that includes at least one double bond that is not present in an aromatic ring.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one embodiment, the present invention provides a coating composition that exhibits excellent adhesion to metal substrates. The coating composition typically comprises a binder, an optional pigment, and an optional liquid carrier. The binder preferably includes a polyester resin that has a backbone or pendant adhesion-promoting ("AP") group, more preferably a backbone AP group, and an optional crosslinker or other optional additives (e.g., flow modifiers, viscosity modifiers, etc.). Preferably, the coating composition includes at least a film-forming amount of the AP-functional resin. Although coating compositions including a liquid carrier are presently preferred, it is contemplated that the AP-functional polyester resin may have utility in other coating application techniques such as, for example, powder coating, extrusion, or lamination.

In one embodiment, the polyester resin may be formed by reacting compounds having reactive functional groups such as, for example, compounds having alcohol, acid, anhydride, acyl or ester functional groups. Alcohol functional groups are known to react, under proper conditions, with acid, anhydride, acyl or ester functional groups to form a polyester linkage.

Suitable compounds for use in forming the polyester resin include mono-, di-, and multi-functional compounds. Di-functional compounds are presently preferred. Suitable compounds include compounds having reactive functional groups of a single type (e.g., mono-, di-, or poly-functional alcohols or mono-, di-, or poly-functional acids) as well as compounds having two or more different types of functional groups (e.g., a compound having both an anhydride and an acid group, or a compound having both an alcohol and an acid group, etc.).

As discussed above, the polyester resin preferably includes at least one AP group, and more preferably a plurality of AP groups (e.g., $\geq 2$, $\geq 3$, $\geq 4$, $\geq 5$, $\geq 10$, etc.). In preferred embodiments, the AP group is a cycloaliphatic group preferably capable of enhancing coating adhesion to a metal substrate. In some embodiments, the cycloaliphatic group includes one or more strained and/or unsaturated rings. In presently preferred embodiments, the AP group is a cycloaliphatic group in the form of a polycyclic group (e.g., a bicyclic group, a tricyclic group, etc.). Bicyclic groups are preferred polycyclic groups, with unsaturated bicyclic groups (e.g., norbornene) being particularly preferred. Examples of suitable cycloaliphatic groups other than polycyclic groups may include certain strained and/or unsaturated cycloaliphatic groups that are not polycyclic (e.g., a monocyclic cycloaliphatic group). It is contemplated that such cycloaliphatic groups may be substituted for some, or all, of the polycyclic groups.

While not presently preferred, it is contemplated that one or more rings of the polycyclic group can be an aromatic group. For example, it is contemplated that a bicyclic group could be used that includes a cycloaliphatic group and an aromatic group, although more preferably the bicyclic group does not include an aromatic group.

In one embodiment, the AP group comprises an unsaturated structure that is at least bicyclic, more preferably bicyclic, and represented by the IUPAC (International Union of Pure and Applied Chemistry) nomenclature of Expression (I) below:

bicyclo[$x.y.z$]alkene

In Expression (I),
x is an integer having a value of 2 or more,
y is an integer having a value of 1 or more,
z is an integer having a value of 0 or more, and the term alkene refers to the IUPAC nomenclature designation (e.g., hexene, heptene, heptadiene, octene, etc.) for a given bicyclic molecule and denotes that that the bicyclic group includes one or more double bonds (more typically one or more carbon-carbon double bonds).

Preferably z in Expression (I) is 1 or more. In other words, preferred bicyclic groups include a bridge with a least one atom (typically one or more carbon atoms) interposed between a pair of bridgehead atoms, where the at least one atom is shared by at least two rings. By way of example, bicyclo[4.4.0]decane does not include such a bridge.

In preferred embodiments, x has a value of 2 or 3 (more preferably 2) and each of y and z independently have a value of 1 or 2.

The bicyclic structures represented by Expression (I) include one or more carbon-carbon double bonds (e.g., 1, 2, 3, etc.).

Non-limiting examples of some suitable unsaturated bicyclic groups represented by Expression (I) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred AP group.

It is contemplated that the bicyclic groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic group) or acyclic groups may be attached to the bicyclic group represented by Expression (I). Thus, for example, in some embodiments the bicyclic group of Expression (I) may be present in a tricyclic or higher group.

In some embodiments, some or all of the bicyclic groups may be saturated. Non-limiting examples of saturated bicyclics include saturated homologs of the structures represented by Expression (I) (i.e., bicyclo[$x.y.z$]alkane, with x, y, and z as previously described) such as, for example, bicyclo[2.1.1]
hexane, bicyclo[2.2.1]heptane, bicyclo[2.2.2]octane, and
bicyclo[3.2.1]octane, bicyclo[4.3.2]undecane, bicyclo[5.2.0]
nonane. An example of a tricyclic group including a saturated
homolog of a structure represented by Expression (I) is
included below, where each "Y", if present, indicates another
portion of the polyester polymer.

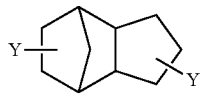

Such a tricyclic group may be provided, for example, using
tricyclodecane dimethanol as an ingredient in forming the
AP-functional polyester polymer.

In an embodiment, the AP-functional polyester polymer is
free or substantially free (e.g., includes less than 10 wt-%, less
than 5 wt-%, less than 1 wt-%, etc.) of polycyclic groups
derived from tricyclodecane dimethanol.

Non-limiting examples of other suitable unsaturated
cycloaliphatic AP groups may include substituted or unsubstituted, unsaturated C4-C9 rings (e.g., cyclobutene, cyclopentene, cyclopentadiene, cyclohexene, cyclohexadiene,
cycloheptene, cycloheptadiene, cyclooctene, and cyclooctadiene). Preferably, the unsaturated cycloaliphatic groups
include at least one double bond located between atoms of a
ring, more preferably at least one carbon-carbon double bond
located between atoms of a ring. In some embodiments, the
aforementioned AP groups may include one or more heteroatoms (e.g., N, O, S, etc.) in a ring of the AP group.

Non-limiting examples of suitable unsaturated strained
cycloaliphatic AP groups may include cycloaliphatic rings
having 3 to 5 atoms (typically carbon atoms), and more typically 3 to 4 atoms such as methylenecyclobutane, ethylidenecyclopropane, and 1,2-dimethylcyclopropene; and
strained polycyclic groups such as, for example, certain bicyclic structures of Expression (I) (or saturated homologues
thereof) where x has a value of 2 or 3 (more preferably 2) and
each of y and z independently have a value of 1 or 2.

Iodine value is a useful measure for characterizing the
average number of non-aromatic double bonds present in a
material. The AP-functional polyester may have any suitable
iodine value to achieve the desired result. In preferred
embodiments, the AP-functional polyester has an iodine
value of at least about 10, more preferably at least about 20,
even more preferably at least about 35, and optimally at least
about 50. The upper range of suitable iodine values is not
limited, but the iodine value typically will not exceed about
100 or about 120. Iodine values may be determined, for
example, using ASTM D5768-02 (Reapproved 2006) entitled
"Standard Test Method for Determination of Iodine Values of
Tall Oil Fatty Acids," and are expressed in terms of centigrams of iodine per gram of resin. In certain embodiments,
the total polyester content (i.e., the total amount of AP-functional polyester and other polyester, if present) of the coating
composition exhibits an average iodine value pursuant to the
aforementioned values.

In some embodiments, at least a majority of the aforementioned iodine values for the AP-functional polyester are
attributable to double bonds present in AP groups of the
polyester resin (e.g., the double bonds present in the AP
groups are sufficient to yield an overall iodine value of at least
10, 20, 35, or 50). In certain embodiments, substantially all, or
all, of the aforementioned iodine values for the AP-functional
polyester are attributable to double bonds present in AP
groups. In a presently preferred embodiment, (i) at least a
majority or (ii) substantially all, or all, of the aforementioned
iodine values for the AP-functional polyester are attributable
double bonds of unsaturated bicyclic groups.

If desired, polyester resins of the invention may also
include non-cycloaliphatic unsaturation. For example, the
polyester resins may include aliphatic unsaturation (i.e., open
chain or linear unsaturation such as would be introduced, e.g.,
using compounds such as maleic anhydride).

The polyester resin of the invention may include any suitable number of AP groups. One useful measure for assessing
the number of AP groups in the AP-functional polyester is the
weight percent (wt-%) of the AP groups relative to the total
weight of the AP-functional polyester resin. In certain preferred embodiments, the AP groups constitute at least about 5,
more preferably at least about 10, even more preferably at
least about 15, and optimally at least about 30 wt-% of the
AP-functional polyester resin. In certain embodiments (e.g.,
where the AP groups are provided using a Diels-Alder reaction involving structural units of the polyester formed from
maleic acid and/or maleic anhydride), the AP groups constitute at least about 40%, 45%, or 50% of the AP-functional
polyester resin. While the upper end is not especially limited,
in some embodiments, the AP groups constitute less than
about 75, less than about 30, or less than about 15 wt-% of the
polyester resin.

Caution should be exercised when interpreting the wt-% of
AP groups because direct measurement of the weight of the
AP groups may not be feasible. Accordingly, the aforementioned wt-%'s correspond to the total weight of (a) AP-containing monomers relative to (b) the total weight of the AP-functional polyester. Thus, for example, if an oligomer having
an AP group is incorporated into the backbone of the polyester resin, the wt-% of AP groups in the polymer is calculated
using the weight of the monomer that includes the AP group
(as opposed to the weight of the oligomer that includes the
monomer). Similarly, if the polyester resin is formed and then
a monomer of the preformed polyester resin is modified to
include the AP group, then the wt-% of AP groups in the
polymer is calculated using the weight of the modified monomer, which may be based on a theoretical calculation if necessary. For example, in a presently preferred embodiment,
polycyclic AP groups (preferably bicyclic groups) are incorporated into the polyester resin via a Diels-Alder reaction of
cyclopentadiene (or another suitable conjugated diene component) across the double bond of a maleic anhydride or acid
monomer present in the backbone of the polyester. In this
situation, the wt-% of AP groups in the polyester is determined using the weight of the resulting bicyclic-modified
monomer present in the polyester.

In certain preferred embodiments, the AP group is connected to at least one other portion of the polyester via a
step-growth or condensation linkage such as an amide, carbamate, carbonate ester (—O—C(=O)—O—), ester, ether,
urea, or urethane linkage group. Ester linkages are presently
preferred. Other organic linkage groups such as, for example,
substituted or unsubstituted hydrocarbyl linking groups may
also be used.

The AP-functional polyester polymer may include polymer segments other than polyester segments. Typically, however, at least 50 wt-% of the polyester will comprise polyester
segments. In some embodiments, substantially all, or all, of
the polyester comprises polyester segments.

In one embodiment, the polyester of the invention includes
at least one divalent backbone AP group that is connected on
each end to another portion of the backbone via a step-growth
or condensation linkage, more preferably an ester linkage. In an embodiment, the divalent backbone AP group is derived from a polyacid compound (e.g., a diacid) or anhydride compound that either includes (i) the AP group (e.g., nadic acid, nadic anhydride, methyl-nadic acid, methyl-nadic anhydride, etc.) or (ii) is modified (e.g., using a Diels-Alder reaction) to include the AP group after incorporation into the polymer (e.g., maleic acid, maleic anhydride, other suitable unsaturated acid or anhydrides, etc.)

In an embodiment, the polyester includes one or more divalent backbone segments having the structure —X—Z—X—, where: (i) each X is independently a step-growth linkage, and typically both X are the same type of step-growth linkage (more preferably both are ester linkages) and (ii) Z is a divalent organic group that includes at least one AP group, more preferably an unsaturated polycyclic group. In an embodiment, each X is an ester linkage oriented such that the —X—Z—X— segment has the structure —O—C(O)—Z—C(O)—O—. Although Z can be of any suitable size, Z preferably includes two or more carbon atoms in a chain connecting the two X groups, and more preferably from 2 to 8, 2 to 6, or 2 to 4 such carbon atoms.

In a presently preferred embodiment, Z includes two carbons atoms in the chain connecting the two X groups. An example of a preferred divalent —X—Z—X— group having two such carbon atoms is depicted below in Expression (II):

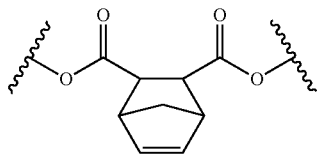 [SMILES: *OC(=O)C1C2C=CC(C2)C1C(=O)O*]

AP functionality may be incorporated into the polyester of the invention using any suitable means. For example, the functionality may be provided by either of the following non-limiting approaches: (A) forming a polyester polymer from a mixture of reactants including one or more reactants having an AP group or (B) modifying a preformed polyester oligomer or polymer to include an AP group.

Examples of non-limiting AP-group-containing compounds for use in approach (A) include (i) compounds having one or more, preferably two or more acid functional groups; (ii) compounds having an anhydride group; (iii) compounds having one or more and preferably two or more ester functional groups; and (iv) compounds having one or more and preferably two or more acyl functional groups. These compounds, in turn, may be reacted with alcohol containing compounds (which may also be AP-group-containing) to form polyester resins having AP groups in the backbone of the resin. Non-limiting examples of commercially available bicyclic-functional compounds include nadic acid, methyl nadic acid, and anhydrides or derivatives thereof.

Non-limiting examples of approach (B) above include providing a preformed unsaturated polyester oligomer or polymer and using a Diels-Alder reaction to modify the polyester to include an unsaturated bicyclic group. Materials and methods for producing a bicyclic Diels-Alder reaction product are discussed in WO 2008/124682. As previously discussed, reacting cyclopentadiene (typically after splitting dicyclopentadiene to yield cyclopentadiene) across a double bond of the polyester is a presently preferred method.

Non-limiting examples of compounds that may be used in a Diels-Alder reaction (e.g., as a conjugated diene component) to incorporate AP groups into the polyester include anthracene, cyclohexadiene, cyclopentadiene (including, e.g., 1-alkyl cyclopentadienes or 2-alkyl cyclopentadienes), furan, thiophene, and combinations or derivatives thereof.

Maleic anhydride and maleic acid are examples of preferred compounds for incorporating unsaturation into an oligomer or polymer for purposes of participating in a Diels-Alder reaction with a conjugated diene component to provide an unsaturated at least bicyclic group. While not intending to be bound by any theory, it is believed that maleic acid and maleic anhydride are particularly strong dienophiles, which allows the Diels-Alder reaction to be conducted at a lower temperature (e.g., from about 150 to about 200° C. at atmospheric pressure as opposed to e.g., about 250° C. at elevated pressure as may be required for unsaturated fatty acids or oils), which may be beneficial in certain embodiments. In some embodiments, it is preferred that 1 mole or less of the conjugated diene component (e.g., anthracene, cyclohexadiene, cyclopentadiene, furan, thiophene, etc.), or 0.5 moles or less in the case of dicyclopentadiene, be used per 1 mole of unsaturated monomer blocks present in the oligomer or polymer. Thus, in some embodiments, it is preferred that 1 mole or less of cyclopentadiene, or 0.5 moles or less of dicyclopentadiene, be used per 1 mole of maleic acid and/or anhydride.

In some embodiments, the coating composition of the present invention, prior to cure (e.g., the liquid coating composition), includes less than 800 parts-per-million ("ppm"), more preferably less than 200, and even more preferably less than 20 ppm of low-molecular weight ethylenically unsaturated compounds (e.g., <500 g/mol, <200 g/mol, <100 g/mol, etc.). Examples of such low-molecular weight ethylenically unsaturated compounds include any of the low-molecular weight conjugated diene components referenced herein such as, for example, anthracene, cyclohexadiene, cyclopentadiene, dicyclopentadiene, furan, thiophene, or a derivative thereof.

If desired, the AP-functional polyester may also be formed from reactants that include a saturated or unsaturated aliphatic acid, ester or anhydride compound. Suitable aliphatic acid, ester and anhydride compounds include aliphatic polycarboxylic acids such as succinic acid, glutaric acid, adipic acid, pimelic acid, suberic acid, azelaic acid, sebacic acid, diglycolic acid, 1,12-dodecanoic acid, tetrapropenyl succinic acid, maleic acid and its anhydride, fumaric acid, itaconic acid, malic acid, dimer fatty acids (e.g., EMPOL 1016), esters of these acids, etc.

If desired, the AP-functional polyester may also be formed from reactants that include an aromatic acid, ester or anhydride (preferably in limited quantities). Suitable aromatic acids, esters and anhydrides include aromatic polycarboxylic acids, esters and anhydrides such as phthalic acid and its anhydride, isophthalic acid, terephthalic acid and its dimethyl ester, benzophenone dicarboxylic acid, diphenic acid, 4,4-dicarboxydiphenyl ether, 2,5-pyridine dicarboxylic acid, 2,6-naphthalenedicarboxylic acid and its dimethyl ester, 4-hydroxybenzoic acid, trimellitic acid and its anhydride, etc.

In some embodiments, the AP-functional polyester may be produced from reactants that include two or more of the following ingredients: saturated aliphatic diacids, unsaturated aliphatic diacids, or aromatic diacids.

Suitable polyols for use in forming the AP-functional polyester include saturated or unsaturated aliphatic or cycloaliphatic polyols. Aromatic polyols, like aromatic acids, may be used (preferably in limited quantities). However, it is believed that these compounds may detract from the reflectivity of the coating, which may be undesirable in certain embodiments. Thus, in some embodiments, the AP-functional polyester is produced from ingredients that are substantially free (e.g., less than 1 wt-% aromatic-containing reactants), or completely free, of aromatic groups.

Examples of suitable non-cyclic polyols include 1,6-hexanediol, pentaerythritol, trimethylolpropane, 2-methyl-1,3-propanediol, neopentyl glycol, 2-butyl-2-ethyl-1,3-propanediol, ethylene glycol, propylene glycol, 1,4-butanediol, 1,3-butanediol, 1,5-pentanediol, trimethylol ethane, 3-hydroxy-2,2-dimethylpropyl 3-hydroxy-2,2-dimethylpropionate (HPHP), etc., and combinations thereof. Examples of suitable cycloaliphatic polyols include 1,2-, 1,3-, and 1,4-cyclohexanediol, 1,2-, 1,3-, and 1,4-cyclohexanedimethanol, hydrogenated bisphenol A, etc., and combinations thereof.

In some embodiments, the backbone of the polyester polymer is hydroxyl-terminated and/or carboxyl-terminated, more preferably hydroxyl-terminated.

The polyester polymer may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D1957-86 (Reapproved 2001) entitled "Standard Test Method for Hydroxyl Value of Fatty Oils and Acids" and available from the American Society for Testing and Materials International of West Conshohocken, Pa. Preferred polyesters have hydroxyl numbers of from about 10 to 150, more preferably from about 20 to 100, and even more preferably from about 30 to 60.

The polyester polymer may have any suitable acid number. Acid numbers are typically expressed as milligrams of KOH required to titrate a 1-gram sample to a specified end point. Methods for determining acid numbers are well known in the art. See, for example, ASTM D974-04 entitled "Standard Test Method for Acid and Base Number by Color-Indicator Titration" and available from the American Society for Testing and Materials International of West Conshohocken, Pa. Preferred polyesters have acid numbers from about 2 to 70, more preferably from about 6 to 40, and even more preferably from about 10 to 30.

In some embodiments, the number average molecular weight (Mn) of the polyester suitably may range from about 1,000 to 15,000, more preferably from about 2,000 to 10,000, and even more preferably from about 3,000 to 6,000.

In other embodiments, the polyester may be an oligomer having a Mn of less than 1,000. For example, in one embodiment, the coating composition comprises a multi-component system with a first component including an AP-functional polyester having a Mn of less than 1,000 (e.g., an AP-functional polyester oligomer) and a second component including a crosslinker such as an unblocked isocyanate crosslinker, with the first and second components coming together at, or slightly before, application to a substrate (e.g., using separate spray application guns).

The AP-functional polyester polymer may have any suitable polydispersity index, which is obtained by dividing the weight average molecular weight by the number average molecular weight. In a preferred embodiment, the AP-functional polyester polymer has a polydispersity index of less than 5, more preferably less than 4, and even more preferably less than 3. While not desiring to be bound by any theory, it is believed that if the polydispersity index of the AP-functional polyester polymer is too high, then the flexibility of the cured coating will be unsuitable for certain end use applications.

The desired glass transition temperature (Tg) may vary depending upon the desired molecular weight of the AP-functional polyester. In embodiments where the polyester has a Mn of greater than 1,000, the polyester preferably has a Tg of at least about 0° C., more preferably at least about 10° C., and even more preferably at least about 20° C. In preferred embodiments, the AP-functional polyester has a Tg of less than about 80° C., more preferably less than about 60° C., and even more preferably less than about 40° C. In certain embodiments where the AP-functional polyester has a Mn of less than 1,000, the Tg may be less than 0° C.

In some embodiments, the AP-functional polymer is preferably free or at least substantially free of fatty acids, oils, and/or other long-chain hydrocarbons. In presently preferred embodiments, the AP-functional polymer includes no more than 10 wt-%, more preferably no more than 3 wt-%, and even more preferably no more than 1 wt-% of fatty acids, oils, or other long-chain hydrocarbons having 8 or more carbon atoms (e.g., $\geq C10$, $\geq C12$, $\geq C15$, $\geq C20$, $\geq C30$), based on the total non-volatile weight of the ingredients used to make the AP-functional polymer.

In a presently preferred embodiment, the AP-functional polymer is not an alkyd. While not wishing to be bound by any theory, it is believed that the use of oils can degrade the adhesion, hardness, and/or weathering resistance properties of cured coatings of the present invention.

The polyesters may be produced by any of the conventional processes, preferably with the use of a catalyst. Esterification typically takes place almost quantitatively and may be monitored by determining the acid and/or hydroxyl numbers or by monitoring the Gardner-Holt viscosity of the product. One or more polymerization or processing aids may be used in production of the polyester such as, for example, catalysts (e.g., stannous oxalate, stannous chloride, butylstannoic acid, dibutyl tin oxide, tetrabutyltitante, or tetra butylzirconate), antioxidants (e.g., hydroquinone, monotertiarybutyl-hydroquinone, bezoquinone, 1,4-napthoquinone,2,5-diphenyl-p-benzoquinone, or p-tert butylpyrocatechol), and mixtures thereof.

The polyesters are typically made in organic solvents such as, for example, cyclohexanone, xylene, high boiling aromatic solvents, such as AROMATIC 100 and 150, and mixtures thereof.

Coating compositions of the invention may include any suitable amount of AP-functional polyester of the invention to produce the desired result. In preferred embodiments, the coating composition includes from about 5 wt-% to about 100 wt-% of AP-functional polyester, more preferably at least about 10 wt-% of AP-functional polyester, and even more preferably at least about 30 wt-% of AP-functional polyester, based on the total nonvolatile weight of the coating composition. Preferably, the AP-functional polyester resin is present in the coating composition in an amount of less than about 90 wt-% and more preferably less than about 70 wt-%, based on the total nonvolatile weight of the coating composition.

In some embodiments, the coating composition can include one or more saturated or unsaturated polyester polymers in addition to the AP-functional polyester. Preferably, the AP-functional polyester constitutes at least a substantial portion of the overall amount of polyester included in the coating composition (e.g., >20 wt-%, >50 wt-%, >75 wt-%, >90 wt-%, >95 wt-%, >99 wt-%, etc. of overall polyester, on a solids basis, is AP-functional polyester). In some embodiments, substantially all, or all, of the polyesters included in the coating composition are AP-functional polyesters. If desired, resins other than polyesters may also be included in the coating composition.

It is further contemplated that the AP-functional polyester resin may be used as an additive to increase the adhesion (to underlying substrate) of a coating composition having a binder system where the polyester binder is predominantly, on a weight basis, other polyester.

If desired, the binder may further comprise an optional crosslinker compound. The crosslinker may be used to facilitate cure of the coating and to build desired physical properties. When present, the amount of crosslinker included in a given coating will vary depending upon a variety of factors, including, e.g., the intended end use and the type of crosslinker. Typically, one or more crosslinkers will be present in the coating composition in an amount greater than about 0.01 wt-%, more preferably from about 5 wt-% to about 50 wt-%, even more preferably from about 10 wt-% to about 30 wt-%, and optimally from about 15 wt-% to about 20 wt-%, based on total resin solids.

Polyesters having hydroxyl groups are curable through the hydroxyl groups. Suitable hydroxyl-reactive crosslinking agents may include, for example, aminoplasts, which are typically oligomers that are the reaction products of aldehydes, particularly formaldehyde; amino- or amido-group-carrying substances exemplified by melamine, urea, dicyandiamide, benzoguanamine and glycoluril; blocked isocyanates, or a combination thereof.

Suitable crosslinkers include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used. Suitable commercial amino crosslinking agents include those sold by Cytek under the tradename CYMEL (e.g., CYMEL 301, CYMEL 303, and CYMEL 385 alkylated melamine-formaldehyde resins, or mixtures of such resins, are useful) or by Solutia under the tradename RESIMENE.

Suitable crosslinkers also include blocked isocyanates. U.S. Pat. No. 5,246,557 describes some suitable blocked isocyanates. Blocked isocyanates are isocyanates in which the isocyanate groups have reacted with a protecting or blocking agent to form a derivative that will dissociate on heating to remove the protecting or blocking agent and release the reactive isocyanate group. Some examples of suitable blocking agents for polyisocyanates include aliphatic, cycloaliphatic or aralkyl monohydric alcohols, hydroxylamines and ketoximes. Presently preferred blocked polyisocyanates dissociate at temperatures of around 160° C. The presence of a catalyst is preferred to increase the rate of reaction between the liberated polyisocyanate and the active hydrogen-containing compound (e.g., a hydroxyl-functional polyester). The catalyst can be any suitable catalyst such as, for example, dibutyl tin dilaurate or triethylene diamine.

In some embodiments, an ultraviolet curing crosslinker or an electron-beam curing crosslinker may be suitable. Examples of suitable such crosslinkers may include 1,6-hexanediol diacrylate, 1,4-butanediol diacrylate, trimethylolpropane triacrylate, or mixtures thereof.

In addition to polyester resin and optional crosslinker compound, the coating composition may contain up to about 60 wt-% of optional pigments and fillers, based on the total nonvolatile weight of the coating composition.

In some embodiments, the coating composition of the invention provides excellent reflectivity. The reflectivity of a given coating composition will typically depend upon a variety of factors, including film thickness, the ingredients used to produce the polyester, and the selection of other ingredients included in the coating. For further discussion of factors that can affect coating reflectivity, see, for example, U.S. Pat. No. 7,244,506. Although coated articles may be constructed using different substrates and/or different coating thicknesses, comparison of coating compositions should typically be made using defined conditions as discussed herein. Compared to conventional polyester coatings of a given thickness, certain embodiments of the coating of the present invention require less pigment to achieve a given level of reflectivity (e.g., as measured by HunterLab LabScan XE Spectrophotometer). Preferred coating compositions of the invention, when blended with rutile $TiO_2$ at a solids loading of 50 wt-% and coated to a dry film thickness of 0.00178 cm, exhibit a Y-value of at least 90.0, more preferably at least 91.0, and even more preferably at least 91.6. Reflectivity may be measured using a suitable spectrophotometer and recording the "Y" value for the coated article, as defined by the formula $L^2/100$, where L represents the absolute whiteness measured over the white portion of Sample-Ease® Systems Form #5E-140 paper, when cured 30 minutes at 250° F. (121° C.).

As discussed in U.S. Pat. No. 7,244,506, the presence of a sufficient number of aromatic groups in a polyester coating composition may affect the reflectivity of the coating composition. When intended for use in high reflectivity end uses, the polyester resin of the invention will preferably include less than 20 wt-%, more preferably less than 15 wt-%, and even more preferably less than 10 wt-% aromatic-group-containing compound, based on the solids weight of reactants used to produce the polyester resin. In some such embodiments, the binder (e.g., polyester resin and optional crosslinker, etc.) will preferably comprise less than 40 wt-%, more preferably less than 30 wt-%, even more preferably less than 20 wt-%, and optimally less than 10 wt-% aromatic-group-containing compound, based on the solids weight of reactants used to produce the polyester resin.

$TiO_2$ is a preferred pigment for high-reflectivity coatings of the present invention. A wide variety of $TiO_2$ fillers are suitable. It is presently preferred to utilize rutile $TiO_2$. If desired, the $TiO_2$ may be surface treated. The surface treatment used may be chosen to fit the particular purpose of the coating. For example, a coating made for an interior application may use a different treatment than one designed for exterior usage.

In some embodiments, the pigment:binder weight ratio of the coating composition is at least 0.9:1, more preferably at least 0.95:1 and most preferably at least 1:1. In certain embodiments, the pigment:binder weight ratio does not exceed about 1.4:1.

Other additives known in the art, such as flow modifiers, viscosity modifiers and/or other binders may be dispersed in the coating composition. A catalytic amount of a strong acid (e.g., p-toluenesulfonic acid) may be added to the composition to hasten the crosslinking reaction.

In preferred embodiments, the coating composition of the invention preferably includes one or more optional liquid carriers. Preferably, the liquid carrier(s) are selected to provide a dispersion or solution of the polyester of the invention for further formulation. The liquid carrier can be an organic solvent (or mixture of organic solvents), water, or a combination thereof. Depending upon the particular embodiment, the coating composition can be a water-based coating composition or a solvent-based coating composition. Non-limiting examples of suitable organic solvents for use in the water-based and/or solvent-based coating compositions of the invention include aliphatic hydrocarbons (e.g., mineral spirits, kerosene, VM&P NAPHTHA solvent, and the like); aromatic hydrocarbons (e.g., benzene, toluene, xylene, the SOLVENT NAPHTHA 100, 150, 200 products and the like); alcohols (e.g., ethanol, n-propanol, isopropanol, n-butanol, iso-butanol and the like); ketones (e.g., acetone, 2-butanone, cyclohexanone, methyl aryl ketones, ethyl aryl ketones, methyl isoamyl ketones, and the like); esters (e.g., ethyl acetate, butyl acetate and the like); glycols (e.g., butyl glycol); glycol ethers (e.g., ethylene glycol monomethyl ether, ethylene glycol monoethyl ether, ethylene glycol monobutyl ether, propylene glycol monomethyl ether, and the like); glycol esters (e.g., butyl glycol acetate, methoxypropyl acetate and the like); reactive diluents such as, for example, hexane diacrylate, trimethylol propane diacrylate, 1,6 hexanediol diacrylate, 1,6 hexanediol dimethacrylate, 1,4 butanediol diacrylate, 1,4 butanediol dimethacrylate, or pentaerythritol triacrylate; or a mixture thereof.

The amount of liquid carrier included in the coating composition will vary, for example, depending upon the application method and the desired amount of solids. Preferred embodiments of the coating composition include at least 20 wt-% of liquid carrier, more typically at least 35 wt-% of liquid carrier. In such embodiments, the coating composition will typically include less than 90 wt-% of liquid carrier, more typically less 80 wt-% of liquid carrier, and even more typically less than 70 wt-% of liquid carrier.

In some embodiments, the coating composition is a solvent-based coating composition that preferably includes no more than a de minimus amount (e.g., 0 to 2 wt-%) of water. In other embodiments, the coating composition can include a substantial amount of water.

In some embodiments, the coating composition preferably includes at least about 10 wt-%, more preferably at least about 20 wt-%, and even more preferably at least about 30 wt-% of water, based on the total weight of the coating composition. In some such embodiments, the coating composition preferably includes less than about 60 wt-%, more preferably less than about 50 wt-%, and even more preferably less than about 40 wt-% of water, based on the total weight of the coating composition. In some water-containing embodiments, the coating composition preferably includes one or more organic solvents in an amount from about 10 to about 70 wt-%, more preferably from about 20 to about 60 wt-%, and even more preferably from about 25 to about 45 wt-%, based on the total weight of the coating composition. While not intending to be bound by any theory, the inclusion of a suitable amount of organic solvent in certain water-based coating compositions of the invention may be advantageous, for example, for certain coil coating applications to modify flow and leveling of the coating composition, control blistering, and maximize the line speed of the coil coater. Moreover, vapors generated from evaporation of the organic solvent during coating cure may be used to fuel the curing ovens. The ratio of water to organic solvent in the coating composition can vary widely depending on the particular coating end use and application methodology.

In some embodiments, the weight ratio of water to organic solvent in the final coating composition ranges from about 0.1:1 to 10:1 (water:organic solvent), more preferably from about 0.2:1 to 5:1, and even more preferably from about 0.7:1 to 1.3:1.

When an aqueous dispersion is desired, the polyester resin of the invention may be rendered water-dispersible using any suitable means, including the use of non-ionic water-dispersing groups, salt groups, surfactants, or a combination thereof. As used herein, the term "water-dispersing groups" also encompasses water-solubilizing groups. In certain preferred embodiments, the polyester resin contains a suitable amount of water-dispersing groups, preferably salt and/or salt-forming groups, such that the polymer is capable of forming a stable aqueous dispersion with an aqueous carrier. Non-limiting examples of suitable salt-forming groups include neutralizable groups (e.g., acidic or basic groups). Non-limiting examples of suitable salt groups include anionic salt groups, cationic salt groups, or combinations thereof.

In water-based coating embodiments, the polyester resin is typically dispersed using salt groups. A salt (which can be a full salt or partial salt) is typically formed by neutralizing or partially neutralizing salt-forming groups of the polyester resin with a suitable neutralizing agent. Alternatively, the polyester resin may be formed from ingredients including preformed salt groups. The degree of neutralization required to form the desired polymer salt may vary considerably depending upon the amount of salt-forming groups included in the polymer, and the degree of solubility or dispersibility of the salt which is desired. Ordinarily in making the polymer water-dispersible, the salt-forming groups (e.g., acid or base groups) of the polymer are at least 25% neutralized, preferably at least 30% neutralized, and more preferably at least 35% neutralized, with a neutralizing agent in water.

Non-limiting examples of anionic salt groups include neutralized acid or anhydride groups, sulphate groups ($-OSO_3^-$), phosphate groups ($-OPO_3^-$), sulfonate groups ($-SO_2O^-$), phosphinate groups ($-POO^-$), phosphonate groups ($-PO_3^-$), and combinations thereof. Non-limiting examples of suitable cationic salt groups include:

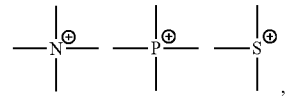

(referred to, respectively, as quaternary ammonium groups, quaternary phosphonium groups, and tertiary sulfate groups) and combinations thereof. Non-limiting examples of non-ionic water-dispersing groups include hydrophilic groups such as ethylene oxide groups. Compounds for introducing the aforementioned groups into polymers are known in the art.

Non-limiting examples of neutralizing agents for forming anionic salt groups include inorganic and organic bases such as an amine, sodium hydroxide, potassium hydroxide, lithium hydroxide, ammonia, and mixtures thereof. In certain embodiments, tertiary amines are preferred neutralizing agents. Non-limiting examples of neutralizing agents for forming cationic salt groups include organic and inorganic acids such as formic acid, acetic acid, hydrochloric acid, sulfuric acid, and combinations thereof.

When acid or anhydride groups are used to impart water-dispersibility, the acid- or anhydride-functional polyester resin preferably has an acid number of at least 5, and more preferably at least 40 milligrams (mg) KOH per gram resin. The acid-functional polyester resin preferably has an acid number of no greater than 400, and more preferably no greater than 100 mg KOH per gram resin.

Alternatively, a surfactant may be used in place of water-dispersing groups to aid in dispersing the polyester resin in an aqueous carrier. Non-limiting examples of suitable surfactants include alkyl sulfates (e.g., sodium lauryl sulfate), ether sulfates, phosphate esters, sulphonates, and their various alkali, ammonium, amine salts and aliphatic alcohol ethoxylates, alkyl phenol ethoxylates, and mixtures thereof.

The total amount of solids present in the coating compositions of the invention may vary depending upon a variety of factors including, for example, the desired method of application. For coil coating application, the coating compositions will typically include from about 30 to about 65 wt-% of solids. In some embodiments, the coating composition may include as much as 80 wt-% or more of solids.

Preferred cured coating compositions of the invention have excellent adhesion, hardness, flexibility, and abrasion resistance. This combination of desirable coating attributes was an unexpected result because, for example, for conventional polyester-based coating compositions, improvements in coating hardness are typically associated with degraded coating flexibility and, vice versa, improvements in coating flexibility are typically associated with degraded coating hardness.

The cured coating composition preferably has a pencil hardness of at least H, more preferably at least 2H, and most preferably at least 3H, when applied to a suitable metal substrate and tested using the methodology of ASTM D3363-05 and a film thickness of 0.00177 centimeters (cm). The pencil hardness can vary depending upon, for example, the type of metal substrate the coating is applied on, the cure conditions of the coating composition, and the substrate pretreatment, if any. Representative substrate and coating cure conditions for pencil hardness testing of the coating composition is provided in the below Examples Sections. Certain preferred coating compositions, when cured, exhibit a pencil hardness of at least 4H, or even at least 5H, when evaluated over a variety of substrates, including cold rolled steel, aluminum, and hot dipped galvanized steel, when the substrate has been pretreated with appropriate pretreatments.

The cured coating composition preferably has a flexibility of 4 T or more flexible, more preferably at least 2 T or more flexible, and most preferably at least 1 T or more flexible when viewed at a 10× magnification (i.e., no cracks are visible when a 1 T specimen is viewed under a 10× magnification glass, no pick off of the coating when tested with #610 Scotch tape). A suitable test method for measuring flexibility is provided in ASTM D4145-83, with a dry film thickness of 0.001651 to 0.001905 cm on a 0.048 cm thick aluminum panel treated with BONDERITE 1455SF pretreatment (Henkel International).

In certain embodiments, additional hardness may be achieved by using at least a portion of compounds (e.g., polyol or poly-acid) having functionality greater than 2, thereby providing substantial branching in the polyester resin. Typically, the desired branching is achieved by using polyols of functionality greater than 2. Notwithstanding the above, in certain embodiments, the polyester resin of the invention is a linear (or substantially linear) polyester.

In some embodiments, the coating composition of the invention is capable of simultaneously exhibiting the aforementioned pencil hardness values and flexibility values.

The coating composition has utility in a multitude of applications. The coating composition of the invention may be applied, for example, as a mono-coat direct to metal (or direct to pretreated metal), as a primer coat, as an intermediate coat, as a topcoat, or any combination thereof. The coating composition may be applied to sheet metal such as is used for lighting fixtures, architectural metal skins (e.g., gutter stock, window blinds, siding and window frames and the like) by spraying, dipping, or brushing, but is particularly suited for a coil coating operation where the composition is applied onto the sheet as it unwinds from a coil and then baked as the sheet travels toward an uptake coil winder. It is further contemplated that the coating composition of the invention may have utility in a variety of other end uses, including, industrial coating applications such as, e.g., appliance coatings; packaging coating applications; interior or exterior steel building products; HVAC applications; agricultural metal products; wood coatings; etc.

Non-limiting examples of metal substrates that may benefit from having a coating composition of the invention applied on a surface thereof include hot-rolled steel, cold-rolled steel, hot-dip galvanized, electro-galvanized, aluminum, tin plate, various grades of stainless steel, and aluminum-zinc alloy coated sheet steel (e.g., GALVALUME sheet steel).

The coating is typically cured or hardened in a heated temperature environment of from about 200 to 500° C., more preferably from about 270 to 470° C. For coil coating operations, the coating is typically baked to a peak metal temperature (PMT) of from about 180 to 250° C., more typically 200 to 250° C. Typical coil dwell time in the oven for a coil coating bake is from about 10 to 30 seconds.

Use of preferred binders of the present invention allows the formulator to achieve high reflectivity at low applied cost. Low applied cost includes savings that may be achieved, for example, by using: (i) single pass coating methods (as opposed to the more expensive multi-pass coating methods necessitated for conventional coatings); (ii) thinner coatings (i.e., lower dried film thickness ("dft")) than that required by conventional coatings to achieve a particular reflectivity value; or (iii) lower pigment loadings than that required by conventional binders to achieve a desired reflectivity value.

The contents of U.S. Provisional Application Ser. No. 61/168,138 filed on Apr. 9, 2009 and PCT Application No. PCT/US2010/030584 filed on Apr. 9, 2010 and entitled POLYMER HAVING UNSATURATED CYCLOALIPHATIC FUNCTIONALITY AND COATING COMPOSITIONS FORMED THEREFROM by Skillman et al., filed on even date herewith, are incorporated by reference.

TEST METHODS

Unless indicated otherwise, the following test methods were utilized in the Examples that follow.

Reflectivity Test

For purposes of this invention the reflectivity of a coating was compared as follows.

The coating is applied in a single pass using a stainless steel wire-wound rod to an aluminum panel (0.0483 cm thick) that has been previously treated with BONDERITE 1455SF pretreatment (Henkel). The panel is placed in a 302° C. (575° F.) electric oven to give a panel baked at a peak metal temperature of 232° C. (450° F.), and a dry film thickness (dft) of 0.7 mil (0.00178 cm). The gauge of the wire-wound rod should be selected to achieve the above dft. DFT is measured using a Crater Film Measurement System (DJH Designs, Inc). The color (L, a, b-values) of each coating are measured using a HunterLab LabScan XE Spectrophotometer (Hunter Associates Laboratory). Reflectance values (Y) were calculated according to convention method of squaring the absolute L-scale value and dividing by 100. In the event it is not feasible to produce a dft of exactly 0.7 mil (0.00178 cm), then specimens on either side of the 0.7 mil target thickness may be measured and a best fit of the spectrophotometer data calculated to provide an estimated value for a specimen of the target 0.7 mil thickness.

Flexibility Test

Coatings described above were tested for flexibility according to ASTM D4145-83. Panels were bent according to the described method and adhesion evaluated according to the described procedure. The preferred adhesive for testing was #610 Scotch tape. Panels were cut to appropriate size for testing, and bends placed on the panel, such that the bend occurred parallel to the metal grain. Two modes of failure were evaluated; the first being the minimum T-bend at which point no tape picked off (NPO) on taping. The second mode of failure is the minimum T-bend at which the paint no longer fractures under 10× magnification (NFX).

Hardness Test

Coatings described above were tested for hardness according to ASTM D3363-05 (2009) Film Hardness by Pencil Test. Coatings were evaluated blind by five individuals and an average reading of the results was tabulated. Evaluations were conducted using Sanford® Turquoise® Drawing Leads in combination with Prismacolor® Turquoise® Model 02022 (10C) 2 mm holders. Failure was reported according to section 8.1.1.1 *Gouge Hardness*, as defined in the ASTM D3363-05 specification.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Polyester Material

Polyester A

Polyester A was prepared from 471 grams of MPDiol (i.e., 2-methyl-1,3 propanediol), 20 grams trimethylol propane, and 509 grams of maleic anhydride in the presence of a suitable esterification catalyst. A Diels-Alder reaction was then performed on Polyester A using 342 grams of dicyclopentadiene. The resulting Polyester A mixture included suitable amounts of Aromatic 150 solvent and PM Acetate solvent (i.e., propylene glycol monomethyl ether acetate). The acid number of Polyester A was 6.2, and the glass transition temperature (Tg) (measured via Differential Scanning Calorimetry (DSC)) was 28.0° C. The final viscosity measured as 60.0% solution in an 80/20 blend of Aromatic 150 solvent/propylene glycol monomethyl ether acetate was Z½+ (Gardner Holdt). The color as measured on the Gardner scale was 1 and the resin was free of haze.

Polyester B

Polyester B was prepared from 522 grams of MPDiol, 15 grams glycerin, and 567 grams of maleic anhydride in the presence of a suitable esterification catalyst. A Diels-Alder reaction was then performed on Polyester B using 377 grams of dicyclopentadiene. The resulting Polyester B mixture included suitable amounts of Aromatic 150 solvent and PM Acetate solvent. The acid number of Polyester B was 23.0 and the Tg was 28.0° C. The final viscosity measured as 63.0% solution in an 80/20 blend of Aromatic 150 solvent/propylene glycol monomethyl ether acetate was X (Gardner Holdt). The color as measured on the Gardner scale was 1 and the resin was free of haze.

Polyester C

Polyester C was prepared from 213 grams MPDiol, 6.1 grams glycerin, and 381 grams Nadic Anhydride in the presence of a suitable esterification catalyst. The reaction flask was flushed with inert gas and the contents were heated to 210° C. over a 9-hour period while removing water. The reaction was held at 210° C. for a final acid number of 9. The acid number of Polyester C was 8.1. The final viscosity measured as a 61.0% solution in an 80/20 blend of Aromatic 150 solvent/propylene glycol monomethyl ether acetate was X-(Gardner Holdt). The color measured on the Gardner scale was 1 and the resin was free of haze.

Example 2

Preparation of Polyester Coatings

Comparative Run 1: Preparation of High Gloss Control Coating (Coating D)

A standard white polyester coating was prepared by first dispersing 100 grams of Millennium RCl-6 (rutile $TiO_2$) in 39 grams of a first conventional polyester resin (64% non-volatile material ("NVM")) based on aromatic diacids and difunctional polyols that did not include any AP groups of the invention, 5 grams xylene, 5 grams propylene glycol methyl ether acetate, and 2 grams of DISPERBYK-110 (Byk Additives and Instruments, a member of Altana) until a Hegman reading of 7+ was obtained. Subsequently, 67.3 grams of the first conventional polyester resin, 26 grams of a second conventional polyester resin (64% NVM) based on aromatic diacids and difunctional polyols that did not include any AP groups of the invention, 15.3 grams RESIMENE 747 amino crosslinker (Solutia), 2.0 grams NACURE 1051 catalyst (King Industries), 10 grams Aromatic 150 organic solvent, 10 grams butyl cellosolve, and 1.0 gram of LINDRON 22 flow additive (Lindau Chemicals) were added and mixed thoroughly. The sample was adjusted to a viscosity of 23 seconds on a Zahn #4 cup at 25° C. using xylene solvent.

Run 2: Preparation of Coating Containing Polyester A (Coating E)

A white polyester coating was prepared by first dispersing 100 grams of Millennium RCl-6 (rutile $TiO_2$) in 38 grams of Polyester A (60% NVM), 5 grams xylene, 10 grams propylene glycol methyl ether acetate, and 2 grams of DISPERBYK-110 additive until a Hegman reading of 7+ was obtained. Subsequently, 100 grams of Polyester A, 15.3 grams RESIMENE 747 amino crosslinker, 2.2 grams NACURE 1051 catalyst, 13 grams Aromatic 150 solvent, 18 grams butyl cellosolve, and 1.0 gram of LINDRON 22 flow additive were added and mixed thoroughly. The sample was adjusted to a viscosity of 23 seconds on a Zahn #4 cup at 25° C. using xylene solvent.

Comparative Run 3: Preparation of 30-Gloss Control Coating (Coating F)

A standard white polyester coating was prepared by first dispersing 100 grams of Millennium RCl-6 (rutile $TiO_2$) in 39 grams of a hydroxyl-functional saturated polyester resin not having any AP groups (64% NVM), 5 grams xylene, 5 grams propylene glycol methyl ether acetate, and 2 grams of DISPERBYK-110 additive until a Hegman reading of 7+ was obtained. Subsequently, 67.3 grams of the hydroxyl-functional saturated polyester resin, 26 grams of an acid-functional saturated polyester resin not having any AP groups (64% NVM), 15.3 grams RESIMENE 747 amino crosslinker, 2.2 grams NACURE 1051 catalyst, 8 grams of GASIL HP-270 matting agent (Ineos), 10 grams Aromatic 150 organic solvent, 10 grams butyl cellosolve, and 1.0 gram of LINDRON 22 flow additive were added and mixed thoroughly. The 60° gloss was adjusted to 30-40% via the addition of GASIL HP-270 matting agent. The sample was adjusted to a viscosity of 23 seconds on a Zahn #4 cup at 25° C. using xylene solvent.

Run 4: Preparation of 30-Gloss Coating Containing Polyester A (Coating G)

A white polyester coating was prepared by first dispersing 100 grams of Millennium RCl-6 (rutile TiO$_2$) in 38 grams of Polyester A (60% NVM), 5 grams xylene, 10 grams propylene glycol methyl ether acetate, and 2 grams of DISPERBYK-110 additive until a Hegman reading of 7+ was obtained. Subsequently, 84 grams of Polyester A, 42 grams of Polyester B, 15.3 grams RESIMENE 747 amino crosslinker, 2.2 grams NACURE 1051 catalyst, 8 grams of GASIL HP-270 matting agent, 13 grams Aromatic 150 organic solvent, 18 grams butyl cellosolve, and 1.0 gram of LINDRON 22 flow additive were added and mixed thoroughly. The 60° gloss was adjusted to 30-40% via the addition of GASIL HP-270 matting agent. The sample was adjusted to a viscosity of 23 seconds on a Zahn #4 cup at 25° C. using xylene solvent.

Comparative Run 5: Preparation of 10-Gloss Control Coating (Coating H)

A standard white polyester coating was prepared by first dispersing 100 grams of Millennium RCl-6 (rutile TiO$_2$) in 39 grams of a hydroxyl-functional saturated polyester resin not having any AP groups (60% NVM), 5 grams xylene, 5 grams propylene glycol methyl ether acetate, and 2 grams of DISPERBYK-110 additive until a Hegman reading of 7+ was obtained. Subsequently, 67.3 grams of the hydroxyl-functional polyester resin, 26 grams of an acid-functional saturated polyester resin not having any AP groups (64% NVM), 15.3 grams RESIMENE 747 amino crosslinker, 2.2 grams NACURE 1051 catalyst, 13 grams of GASIL HP-270 matting agent, 10 grams Aromatic 150 organic solvent, 10 grams butyl cellosolve, and 1.0 gram of LINDRON 22 flow additive were added and mixed thoroughly. The 60° gloss was adjusted to 10-15% via the addition of GASIL HP-270 matting agent. The sample was adjusted to a viscosity of 23 seconds on a Zahn #4 cup at 25° C. using xylene solvent.

Run 6: Preparation of 10-Gloss Coating Containing Polyester A (Coating I)

A white polyester coating was prepared by first dispersing 100 grams of Millennium RCl-6 (rutile TiO$_2$) in 38 grams of Polyester A (60% NVM), 5 grams xylene, 10 grams propylene glycol methyl ether acetate, and 2 grams of DISPERBYK-110 additive until a Hegman reading of 7+ was obtained. Subsequently, 84 grams of Polyester A, 42 grams of Polyester B, 15.3 grams RESIMENE 747 amino crosslinker, 0.40 grams NACURE 1051 catalyst, 13 grams Aromatic 150 organic solvent, 18 grams butyl cellosolve, and 1.0 gram of LINDRON 22 flow additive were added and mixed thoroughly. The 60° gloss was adjusted to 10-15% via the addition of GASIL HP-270 matting agent. The sample was adjusted to a viscosity of 23 seconds on a Zahn #4 cup at 25° C. using xylene solvent.

Run 7: Preparation of 30-Gloss Coating Containing Polyester C (Coating J)

A white polyester coating was prepared by first dispersing 100 grams of Millennium RCl-6 (rutile TiO$_2$) in 38 grams of Polyester C (60% NVM), 5 grams xylene, 10 grams propylene glycol methyl ether acetate, and 2 grams of DISPERBYK-110 additive until a Hegman reading of 7+ was obtained. Subsequently, 84 grams of Polyester C, 42 grams of Polyester B, 15.3 grams RESIMENE 747 amino crosslinker, 2.2 grams NACURE 1051 catalyst, 8 grams of GASIL HP-270 matting agent, 13 grams Aromatic 150 organic solvent, 18 grams butyl cellosolve, and 1.0 gram of LINDRON 22 flow additive were added and mixed thoroughly. The 60° gloss was adjusted to 30-40% via the addition of GASIL HP-270 matting agent. The sample was adjusted to a viscosity of 23 seconds on a Zahn #4 cup at 25° C. using xylene solvent.

Example 3

Coated Panels

Panels were cured on 0.019-inch (0.0483 cm) thick aluminum panels that had been previously treated with BONDERITE 1455SF pretreatment (Henkel). Single-coat drawdowns (direct to metal) were made using a stainless steel wire-wound rod to provide a dry film thickness of 0.69-0.71 mils (0.00178 cm). The panels were placed in a 575° F. electric oven (302° C.) for 25 seconds to give a panel baked at a peak metal temperature of 450° F. (232° C.). Coatings were evaluated for general physical performance and compared against standard coatings. The results of the tests are presented in Table 1 below.

TABLE 1

|  | Coating D | Coating E | Coating F | Coating G | Coating H | Coating I | Coating J |
|---|---|---|---|---|---|---|---|
| 60° Gloss | 91 | 90 | 35 | 36 | 11 | 11 | 34 |
| Pencil hardness | F | 3H | F | 3-4H | F | 3-4H | 3H |
| T-bend flexibility (NPO*/NFX**) | 0T/1T | 0T/1T | 0T/2T | 0T/2T | 1T/2T | 0T/2T | 0T/2T |

*NPO is the abbreviation for "no pick off," which is defined in ASTM D4145-83.
**NFX is the abbreviation for "no fracture," which is defined in ASTM D4145-83.

As indicated by the data in Table 1, Coatings E, G, I, and J of Example 2 exhibited superior hardness relative to the comparative coating compositions, while still exhibiting good reflectivity and flexibility (and in some cases better flexibility).

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A coating composition, comprising:
   a binder comprising:
      a polyester resin having a hydroxyl value of 10 to 150, acid number of 6 to 40 and glass transition temperature of 0° C. to 80° C. that includes at least 5 weight percent of a polycyclic group containing monomer in the polyester backbone, wherein the weight percent of the polycyclic group containing monomer is based on the total weight of the polyester resin, wherein the one or more polycyclic groups is provided by nadic acid, nadic anhydride, methyl-nadic acid, methyl-nadic anhydride, a derivative thereof, or a mixture thereof, and the polyester resin has iodine value of at least 10; and a crosslinker comprising an aminoplast, an amino- or amido-group carrying substance, a blocked isocyanate, or a combination thereof, wherein the polyester resin is substantially free of polycyclic groups derived from tricyclodecane dimethanol, and includes less than 3 weight percent of fatty acids or oils, based on the total non-volatile weight of ingredients used to make the polyester resin.

2. The coating composition of claim 1, wherein the polyester resin has iodine value of at least 35.

3. The coating composition of claim 1, wherein the polyester resin has a glass transition temperature of from 20 to 80° C.

4. The coating composition of claim 1, wherein the polyester resin has a number average molecular weight from about 1,000 to about 6,000.

5. The coating composition of claim 1, wherein the polyester resin has a polydispersity index of less than 3.

6. The coating composition of claim 1, wherein the one or more polycyclic groups is present in a divalent backbone segment that is connected on each end via an ester linkage to another portion of a backbone of the polyester resin.

7. The coating composition of claim 6, wherein the divalent backbone segment is derived from an unsaturated diacid or dianhydride monomer.

8. The coating composition of claim 1, wherein the coating composition comprises, based on total resin solids, at least about 50 weight percent of the polyester resin and at least about 5 weight percent of the crosslinker.

9. The coating composition of claim 8, wherein the coating composition includes, based on total resin solids, at least 10 to 20 weight percent of aminoplast crosslinker.

10. The coating composition of claim 1, further comprising a liquid carrier.

11. A method, comprising:
providing a planar metal substrate having a cured coating formed from the coating composition of claim 1 applied on at least a portion of the metal substrate; and
fabricating the coated planar metal substrate into an article.

12. A coated article, comprising:
a metal substrate; and a thermally cured coating formed from the coating composition of claim 1 applied on at least one major surface of the metal substrate.

\* \* \* \* \*